US009483213B1

(12) United States Patent
Wharton et al.

(10) Patent No.: US 9,483,213 B1
(45) Date of Patent: Nov. 1, 2016

(54) VIRTUAL MEDIA CHANGERS

(71) Applicant: Amazon Technologies, Inc., Reno, NV (US)

(72) Inventors: Ian Wharton, Seattle, WA (US); Pradeep Vincent, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 13/872,514

(22) Filed: Apr. 29, 2013

(51) Int. Cl.
*G06F 3/06* (2006.01)

(52) U.S. Cl.
CPC ............. *G06F 3/0682* (2013.01); *G06F 3/062* (2013.01); *G06F 3/0623* (2013.01); *G06F 3/0647* (2013.01)

(58) Field of Classification Search
CPC .... G06F 3/062; G06F 3/0623; G06F 3/0647; G06F 3/0682
See application file for complete search history.

(56) References Cited

U.S. PATENT DOCUMENTS

| | | | |
|---|---|---|---|
| 5,485,321 A | 1/1996 | Leonhardt et al. | |
| 6,049,848 A | 4/2000 | Yates et al. | |
| 6,125,468 A | 9/2000 | Kim et al. | |
| 6,732,124 B1 | 5/2004 | Koseki et al. | |
| 7,127,575 B2 | 10/2006 | Kano | |
| 7,698,532 B1 | 4/2010 | Gonzalez | |
| 8,230,187 B1* | 7/2012 | Krinke et al. | 711/162 |
| 8,935,470 B1 | 1/2015 | Fair | |
| 2002/0035664 A1 | 3/2002 | Yates et al. | |
| 2004/0034811 A1 | 2/2004 | Trimmer et al. | |
| 2004/0085723 A1 | 5/2004 | Hartung | |
| 2005/0193235 A1 | 9/2005 | Sandorfi et al. | |
| 2006/0047905 A1 | 3/2006 | Matze et al. | |
| 2006/0200623 A1* | 9/2006 | Gonzalez | G06F 3/0607 711/111 |
| 2007/0198722 A1 | 8/2007 | Kottomtharayil et al. | |
| 2007/0266037 A1 | 11/2007 | Terry et al. | |
| 2008/0082310 A1 | 4/2008 | Sandorfi et al. | |
| 2008/0120482 A1 | 5/2008 | Jarvis et al. | |
| 2008/0222344 A1 | 9/2008 | Upadhyayula | |
| 2008/0250197 A1 | 10/2008 | Daily et al. | |
| 2008/0301363 A1 | 12/2008 | Kitamura et al. | |
| 2009/0037451 A1 | 2/2009 | Borrill | |
| 2009/0323218 A1 | 12/2009 | Thompson et al. | |
| 2010/0100676 A1 | 4/2010 | Johnson et al. | |
| 2010/0180074 A1* | 7/2010 | Slater et al. | 711/111 |
| 2010/0185813 A1* | 7/2010 | Muroyama | G06F 11/1658 711/111 |
| 2010/0306462 A1 | 12/2010 | Otsuka | |
| 2010/0318612 A1 | 12/2010 | Agarwal et al. | |
| 2011/0099346 A1* | 4/2011 | Toshine | G06F 3/061 711/162 |
| 2011/0107024 A1 | 5/2011 | Bish et al. | |
| 2012/0047338 A1* | 2/2012 | Akirav et al. | 711/162 |
| 2012/0166723 A1 | 6/2012 | Araki et al. | |

(Continued)

OTHER PUBLICATIONS

International Search Report and Written Opinion mailed Jun. 2, 2014, International Patent Application Na PCT/US2013/075191, filed Dec. 13, 2013.

*Primary Examiner* — Aracelis Ruiz
(74) *Attorney, Agent, or Firm* — Davis Wright Tremaine LLP

(57) ABSTRACT

A virtual tape system utilizes multiple virtual tape libraries. Some virtual elements of the virtual tape libraries are connected elements, such as virtual import/export slots, that logically connect two or more virtual tape libraries. Virtual media changers of the virtual tape libraries can be commanded, as if physical media changers, to virtually move virtual media, such as virtual tapes, within and among the virtual tape libraries. By moving a virtual medium to a connected element, the virtual medium can be virtually moved from one virtual tape library to another.

29 Claims, 10 Drawing Sheets

(56) References Cited

U.S. PATENT DOCUMENTS

2013/0166960 A1  6/2013  Das et al.
2013/0173859 A1  7/2013  Gorrell et al.
2013/0271865 A1  10/2013  Amir et al.
2014/0052691 A1  2/2014  Sasson et al.

* cited by examiner

VIRTUAL MEDIA CHANGERS

CROSS-REFERENCE TO RELATED APPLICATIONS

This application incorporates by reference for all purposes the full disclosure of co-pending U.S. patent application Ser. No. 13/722,814, entitled "VIRTUAL TAPE USING A LOGICAL DATA CONTAINER," filed Dec. 20, 2012 and U.S. patent application Ser. No. 13/722,743, entitled "VIRTUAL TAPE LIBRARY SYSTEM," filed Dec. 20, 2012.

BACKGROUND

Organizations back up data in case of data loss or corruption. For example, sensitive organizational data (e.g., data of and/or about clients of an organization) may be under many different threats, including environmental threats, security threats, accidents and/or failures. Environmental dangers include storms or other natural disasters that can disrupt or damage client systems. Security threats include hackers that may maliciously enter a production system and corrupt or destroy data and/or software. Accident threats include such problems as software bugs that corrupt or make inconsistent data. Failure threats include the failure of hardware systems, such as the correlated failure of multiple storage devices that contain critical data. If a backup is present, then at least the data and/or software may be reset back to a known, good point in time. In addition, some organizations back up data for the purpose of compliance with various regulations that require the storage of certain data for various periods of time.

One method of backing up data is through a tape backup system. A tape backup system uses tape cartridges to store data. In some companies, a tape backup system may be partially or fully automated such that tapes may be moved by robotic arm from a storage location to a tape drive and then back to a storage location. For example, a client archive system may send commands to the robotic system to move tapes from one location to another and track the movement of the tapes. The client archive system may also track the information written to the tapes, in order to recall files or other information if needed for a restore operation. These robotic systems may require significant capital costs, such as costs related facilities to house the systems and maintenance of the mechanical systems to operate efficiently.

BRIEF DESCRIPTION OF THE DRAWINGS

Various embodiments in accordance with the present disclosure will be described with reference to the drawings, in which.

DETAILED DESCRIPTION

Figure 1:
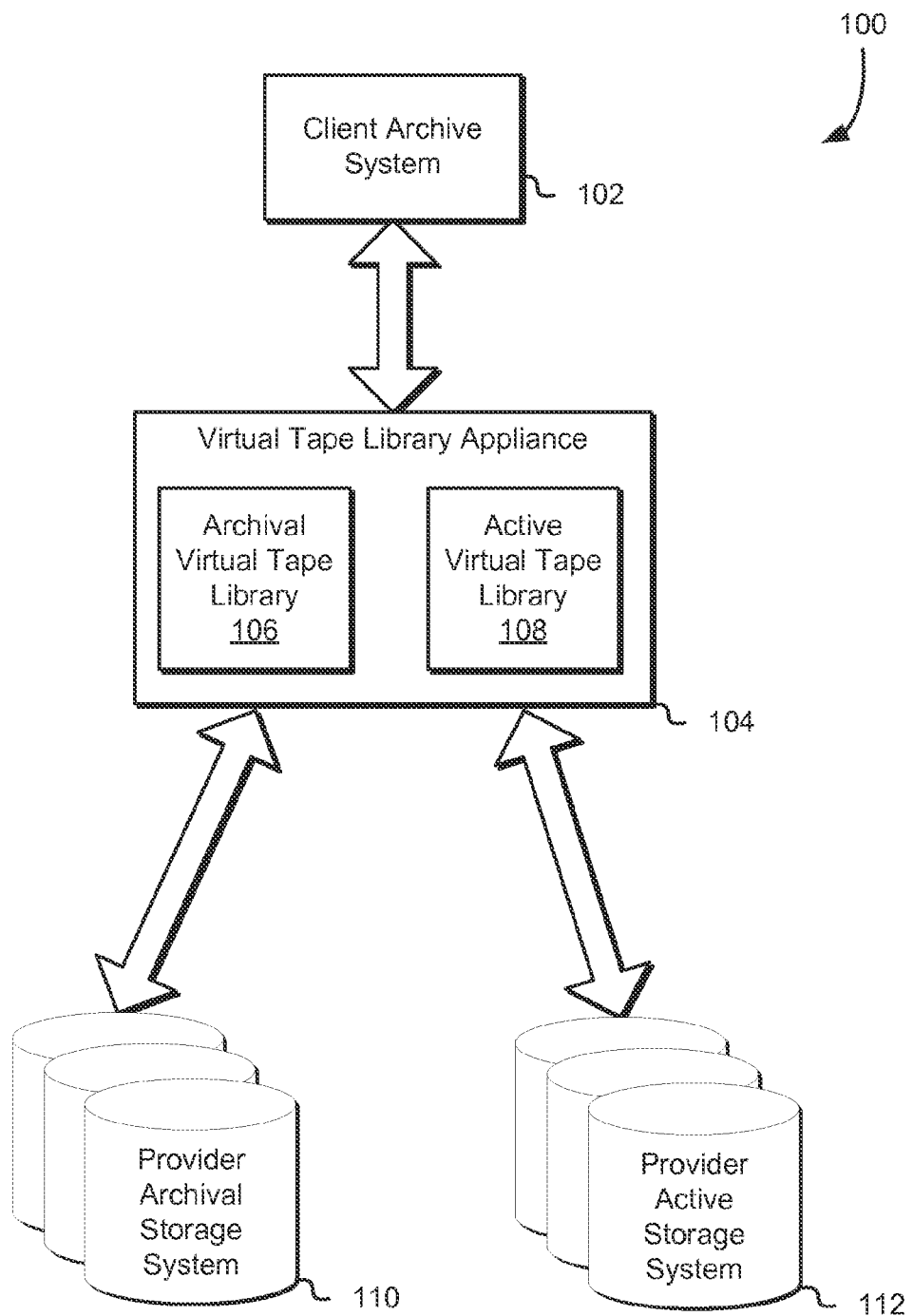
FIG. 1 shows an illustrative example of a virtual tape library in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include implementing a virtual tape library system to back up data from a client archive system expecting physical tape operations onto logical data containers and/or a metadata store of a storage service by emulating the physical tape operations. For example, a virtual tape library appliance is installed at a customer premise location to interface with a client archive system. The virtual tape library emulates a physical tape library such that a client archive system may operate on virtual tapes to archive client data. The virtual tape library appliance provides virtual interfaces to appear as physical tape library subsystems, such as tape drives and media changing interfaces. However, these virtual interfaces are supported by logical data containers in a storage service and a metadata store. The virtual tape library system allows the client archive system to make requests to import new virtual tapes, export virtual tapes for archiving, store virtual tapes at a virtual location, load and eject virtual tapes into a virtual tape drive and operate on virtual tapes in a virtual tape drive.

Operations on a virtual tape in a virtual tape drive may include seeking, reading, writing, initializing, marking and other physical tape operations emulated by the virtual tape library system. These requests for manipulation of tape cartridges by the client archive system are translated by the virtual tape library system to operate on a metadata store and/or logical data containers of a storage service. Movement operations, such as moving a virtual tape from one virtual location to another, may be accomplished by changing an association between the virtual tape and a virtual location in the metadata store. Data operations, such as reading or writing to a virtual tape, may be accomplished through an interface that operates in conjunction with the storage service on the logical data container. The storage service may be an on-demand storage service (an example of an "active" storage service) in which logical data containers are provisioned on an as-needed basis. In some embodiments, the storage service and the virtual tape library appliance may be separated by a public network, such as the Internet. By providing the virtual tape library system, a client may be able to actively manage resources for backup as needed, while reducing the cost required for tape hardware maintenance. For example, virtual tapes may be constructed or deleted on an on-demand basis to match storage needs and costs.

In one embodiment, a client backs up data to a virtual tape and stores the virtual tape in archival storage. A new virtual tape is requested by a client through an active storage provisioning interface. The virtual tape is created by provisioning a new logical data container in the storage service and associating the logical data container with a virtual tape identifier (ID), such as an association in the metadata store. The new virtual tape is then virtually placed in the virtual import/export slot in the virtual tape library. The movement of the virtual tape is accomplished by associating the virtual tape ID with a virtual import/export slot in the metadata store. Once the virtual tape is in the virtual import/export slot, the client archive system may assume control of the virtual tape. The client archive system may then request the virtual tape be moved to a virtual tape drive through a virtual media changer of the virtual tape library system. This movement may be accomplished by removing the association of the virtual tape ID with the virtual import/export slot and associating the virtual tape ID with a virtual tape drive.

A virtual tape drive interface, such as Internet Small Computer System Interface (iSCSI, also referred to as the Small Computer System Interface over Internet Protocol), associated with the specific virtual tape drive selected may be assigned to the logical data container associated with the virtual tape ID. The new virtual tape may then be initialized, which may include writing a basic virtual tape structure, such as a global header, to the logical data container. After initialization, the client systems may back up data through the client archive system to the virtual tape. The backing up of data may be accomplished by the virtual tape library appliance receiving tape commands and translating the tape commands to operations that operate on a virtual tape structure on the logical data container assigned to the virtual tape drive in the storage service. These operations may include writing data, making records and making file marks. After the backup is complete, the client archive system may request the virtual tape be moved from the virtual tape drive to the virtual import/export slot for archival storage. In response, the virtual tape library appliance may cause the association of the virtual tape drive and the virtual tape ID to be removed, as well as the assignment of the virtual tape drive interface to the logical data container. The logical data container may then be staged for transfer to an archival service from the active storage of the storage service.

In another embodiment, a client restores data from a virtual tape in archival storage. The client may request the virtual tape be transferred from archival storage to a virtual import/export slot through a provider storage system. In response, the provider may transfer the logical data container associated with the virtual tape from archival storage to active storage.

Upon completion of the transfer, the virtual tape library system may associate the virtual tape ID with the virtual import/export slot. Once the virtual tape is in the virtual import/export slot, the client archive system may assume control of the virtual tape. The client archive system may then request the virtual tape be moved to a virtual tape drive through a virtual media changer of the virtual tape library system. This movement may be accomplished by removing the association of the virtual tape ID with the virtual import/export slot and associating the virtual tape ID with a virtual tape drive. A virtual tape drive interface associated with the specific virtual tape drive selected may be assigned to the logical data container associated with the virtual tape ID. The client archive system may then perform operations on the virtual tape, such as locate, space, read or other tape operations. These operations may then be used to determine which data to retrieve from the logical data container.

After the restore is complete, the client archive system may request the virtual tape be moved from the virtual tape drive to the virtual import/export slot for archival storage or to a virtual tape slot location to await further action. In response, the virtual tape library appliance may cause the association of the virtual tape drive and the virtual tape ID to be removed, as well as the assignment of the virtual tape drive interface to the logical data container. In the case of re-archival, the logical data container may then be staged for transfer to an archival service from the active storage of the storage service. In the case of a virtual tape slot location, an association between the virtual tape ID and a virtual tape slot location may be stored.

In other embodiments, virtual tapes may be reinitialized or destroyed. In reinitialization, a virtual tape is erased of its current data. The client archive system may request that a virtual tape be loaded in a virtual tape drive through a virtual media changer. As discussed above, as a result of the request to load the virtual tape, a logical data container associated with the virtual tape may become associated with an interface to a virtual tape drive. The client archive system may then request the virtual tape drive reinitialize the virtual tape. In some embodiments, this reinitialization may be accomplished by changing a generation identifier in the global header of the logical data container to invalidate all data within the logical data container. After reinitialization, the client archive system may use the virtual tape or request the tape be moved back to a virtual tape slot location to await use. The client archive system may also request that tapes be destroyed. The client archive system may request the virtual tape be moved from the virtual tape drive to the virtual import/export slot for destruction. In response, the virtual tape library appliance may cause the association of the virtual tape drive and the virtual tape ID to be removed, as well as the assignment of the virtual tape drive interface to the logical data container. The logical data container may then be deprovisioned.

An advantage of the current system is that a cost of use may scale to the actual usage of the system. For example, a client may use hourly, daily, weekly, monthly, annual and other time spans between backups to virtual tape. After one week, a client may wish to destroy all hourly backups except a midnight backup to represent a daily backup. Destruction of the remaining hourly backups results in no further cost for the destroyed virtual tapes.

A storage service may provide multiple tiers of storage that may be used to store virtual tapes. The storage service may use varying storage systems including object storage or block storage. In one embodiment, an active storage and archival storage may be used. The active storage may provide a response that is adequate for reading and writing of data. The archival service may provide service with too high of a latency that makes it inadequate to read or write, but adequate for longer term storage. For example, an active storage logical data container may provide synchronous read and write responses, such as confirmations or data from the read or write. An archival storage logical data container may provide asynchronous responses, such as a job identifier for each request. The job identifier may then be queried to determine if the job has completed. Both logical data containers may also include data objects of varying size that include one or more logical data containers. In use, when a virtual tape is placed in the virtual import/export slot, the logical data container behind the virtual tape may be staged for transfer between the active storage and archival storage.

In another embodiment, a three tiered storage may be used. The three tiered storage may be viewed in terms of how long a logical data container associated with a virtual tape would need to be ready for data transfer. For example, three logical data containers may be stored in locations of the virtual library. The first logical data container may be stored in a first tier that is ready to be accessed. When the client archive system requests the virtual tape associated with the first logical data container be loaded in the virtual tape drive, the logical data container may be ready once the virtual tape drive interface becomes associated with the logical data container. A second logical data container may be stored in a second tier that may be ready for access in minutes. When the client archive system requests the virtual tape associated with the second logical data container be loaded in the virtual tape drive, the second logical data container may be transferred to a higher storage tier before the virtual tape is ready to receive data. The second logical data container may be made available in minutes due to the moderate performance of the storage tier. A third logical data container may be stored in a third tier that may be ready for access in hours or more. When the client archive system requests the virtual tape associated with the third logical data container be loaded in the virtual tape drive, the third logical data container may be transferred to a higher storage tier before the virtual tape is ready to receive data. The third logical data container may be made available in hours or more, due to the low performance of the storage tier. In some embodiments, the second or third logical data containers may be routed through a virtual import/export slot rather than the virtual library storage location. An advantage of the multiple tier structure is that a client may decide its needs for availability of the backup data. Long term storage may be more cheaply stored with a longer response time, while active data may be readily available with a more expensive cost.

As noted, a client archive system may interact with virtual media changers of a virtual tape appliance to perform media changing operations, such as moving virtual tapes within and between virtual tape libraries as if moving actual tapes throughout a physical virtual tape system. In some embodiments, a virtual tape appliance implements multiple virtual tape libraries, each corresponding to a type of data storage. For example, in some examples, a virtual tape appliance implements an archival virtual tape library and an active virtual tape library. The archival virtual tape library may correspond to archival data storage. Virtual movement of a virtual tape to an archival virtual tape library may indicate an intent to archive data corresponding to the virtual tape and, as such, the data may be moved to or may remain in archival storage. The active virtual tape library may correspond to an active data storage system with which data access is quicker relative to the archival data storage system. The active data storage system may also have other performance advantages over the archival data storage system. For example, data from the active data storage system may be available synchronously (e.g., available in a response to a request for the data) while data from the archival data storage system may be available asynchronously (e.g., requiring a second request to retrieve data once the data has been staged for access).

For example, in one configuration, a virtual media changer of an active virtual tape library may represent on-line items, that is, items in an active storage system that are available for access. The virtual media changer may contain virtual elements that operate similarly to elements of a physical media changer. Example elements include, but are not limited to, data transfer elements, storage elements and import/export elements. Clients (e.g., tape library management software) can interact with this virtual media changer device in the same way they would a physical media changer device, in order to access and manipulate media and their contents using virtual tape library components (e.g., virtual tape drives). A second virtual media changer device (the archival virtual media changer) represents the off-line items, that is, items that are stored in archival storage and, as such, are not immediately available. The archival virtual media changer may contain, in some examples, storage elements and import/export elements, but no data transfer elements.

Virtual tape libraries in accordance with the various embodiments may be logically connected by virtual import/export slots. In some examples, movement of a virtual tape to a virtual import/export slot may cause the virtual tape to virtually move from one virtual tape library to another virtual tape library that is logically connected. The logical connection may be made in various ways. In some embodiments, at least one of the import/export elements from each virtual media changer device of a virtual tape library is considered connected to another virtual media changer device of another virtual tape library, and as such, the system implementing the virtual devices exposes the same identifier to their clients for these elements.

In various embodiments, using a virtual media changer of an active virtual tape library to transfer a virtual medium (e.g., virtual tape) from its current location to the connected virtual import/export slot (or another type of connected element) causes the medium to disappear from the connected element of the active virtual media changer (and virtual tape library) and, perhaps sometime later, appear in the connected element (e.g., virtual media changer) of the archival virtual tape library. At this point, the medium is off-line and the state change (archival of tape cartridge data) may be complete.

In some embodiments, in order to bring a medium on-line (e.g., to make data corresponding to the medium available for access), a client sends the virtual media command to transfer a medium from its current location in the archival virtual tape library to that device's connected element (e.g., virtual import/export slot). The medium may then disappear from the archival virtual tape library and, perhaps sometime later, appears in the connected element (e.g., virtual import/export slot) of the active virtual tape library. At this point, the item is online (i.e., available for access) and the state change (retrieval of tape cartridge data from archival storage) may be complete. Because the devices expose the same identifier for their connected elements, clients of both virtual tape libraries have enough information to deduce their interconnected configuration and are capable of initiating the state change automatically without operator intervention.

In some embodiments, elements do not share common identifiers, but are otherwise usable to move virtual media among virtual tape libraries. For example, at least one element from each of the archival and active virtual tape libraries (referred to as an "associated element," which is a broader term that encompasses connected elements) is considered associated to the other, such as through an association in a data store. Though the identifiers are different for each of the associated elements, the associated elements may be used to express the elements' association to an operator of the devices, which may be a human or automated operator.

The operator may deduce the association between elements and initiate a medium's state change, via the client, by moving the medium from its current location in one virtual tape library to the associated element of that virtual tape library. After transfer to the associated element, the medium may disappear from the source virtual tape library and, perhaps sometime later, appear in the corresponding associated element of the other virtual tape library. At this point, the state change may be complete. In this manner, backup administrators can archive and restore data using a virtual tape library interface via standard backup application since both archival and active virtual tape libraries can be accessed via a virtual tape library interface.

Turning now to FIG. 1, an illustrative example of an environment 100 for utilizing virtual tape libraries in accordance with at least one embodiment is shown. In the environment 100 shown, a client archive system 102 may communicate with a virtual tape library appliance 104 such that the client archive system 102 may use a storage service 105 rather than physical tape media. A client archive system 102 may be a computer system or component thereof (e.g., programming module) configured to operate with systems utilizing physical tape media. A virtual tape library appliance 104 may be communicatively connected to the client archive system 102 to emulate operations performed in connection with physical tape media.

In an embodiment, the virtual tape library appliance 104 is configured with multiple virtual tape libraries. In this example, the virtual tape library appliance 104 includes an archival virtual tape library 106 and an active virtual tape library. As discussed in more detail below, the client archive system 102 may interact with the virtual tape library appliance 104 to move virtual tapes between the archival virtual tape library 106 and the active virtual tape library 108. In some embodiments, the client archive system 102 is configured to issue commands to the virtual tape library appliance using an industry standard protocol, such as the small computer system interface (SCSI) protocol and/or protocols that utilize other protocols to transmit SCSI commands, such as SCSI over Internet Protocol (iSCSI). Further, the commands transmitted from the client archive system 102 to the virtual tape library appliance 104 to virtually move virtual tapes between the archival virtual tape library 106 and the active virtual tape library 108 may be SCSI media changer commands, thereby enabling the client archive system 102 to interact with the virtual tape library appliance 104 as if issuing SCSI commands to a media changer of a physical tape system. The SCSI Media Changer command sets (e.g., SMC-2, SMC-3) are incorporated herein by reference.

As illustrated in FIG. 1, the archival virtual tape library 106 and active virtual tape library 108 each correspond to a respective data storage system. In this example, the archival virtual tape library 106 corresponds to a provider archival storage system 110 and the active virtual tape library 108 corresponds to a provider active storage system 112. The provider archival storage system 110 and provider active storage system 112 may be storage systems configured to operate according to different performance characteristics. For instance, the provider archival storage system 110 may be configured to store data in a manner that reduces the costs of storage at the expense of performance in connection with data access. As one illustrative example, the provider archival storage system may be configured to perform data operations (i.e., store and retrieve data) asynchronously to take advantage of cost savings afforded by batch processing and parallelism. For instance, a client of the provider archival storage system 110 may receive requests to access data objects stored in the provider archival storage system, aggregate the requests, process the requests in batches and make the requested data available for retrieval using additional requests. Due to the asynchronous processing, the provider archival storage system 110 may require another request to retrieve a data object once the data object has been made ready for retrieval, such as by reading the data object from one or more archival data storage devices and writing the data to one or more staging data storage devices from which the data object is available.

The provider active storage system 112, on the other hand, may be configured to provide better performance with respect to data access. For example, the provider active storage system 112 may be configured to synchronously process requests to store and/or access data. To enable better performance relative to the provider archival storage system 110, the provider active storage system 112 may operate using additional computing resources (e.g., databases) that enable the provider active storage system 112 to locate and retrieve data quickly relative to the provider archival storage system 110. The provider active storage system 112 may provide synchronous data access. For example, the provider active storage system may maintain stored data in a manner, such that when a request for a data object is retrieved, the data object can be provided (or streaming of the data object can be initiated) in a response to the request.

The provider archival storage system 110 and provider active storage system 112 may be utilized as services. Because of the differences in performance, the costs for utilization of the services may vary accordingly. For instance, long term storage of data in the provider archival storage system 110 may be cheaper relative to the provider active storage system 112 due to the relatively lower performance with respect to data access. Similarly, the retrieval of data from the provider active storage system 112 may be cheaper relative to retrieval of data from the provider archival storage system 110. To utilize the services, the provider archival storage system 110 and provider active storage system 112 may be accessible over a network (e.g., the Internet) using appropriately configured API calls to the systems. Each of the provider archival storage system 110 and provider active storage system 112 may provide, for instance, a web service interface that enables users of the storage systems to utilize the storage systems through appropriately configured web service calls.

To utilize the provider archival storage system 110 and provider active storage system 112, the virtual tape library appliance 104 may receive from the client archive system 102 commands that are translated to appropriate commands of the provider archival storage system 110 and provider active storage system 112, such as creating associations between virtual constructs in a metadata store or storing data in a virtual tape structure in a provider active storage system 112 through communication with a provider archival storage system 110, such as application programming interface (API) calls. The virtual tape library appliance 104 may also request management tasks from a management system, such as creating or destroying logical data containers utilized by the provider archival storage system 110. In some embodiments, the virtual tape library appliance 104 translates SCSI commands to appropriate API calls of the provider archival storage system 110 and provider active storage system 112 as appropriate.

As noted, the client archive system 102, in some embodiments, can issue media changer commands to the virtual tape library appliance 104 to virtually move virtual tape media between the archival virtual tape library 106 and the active virtual tape library 108. The virtual tape library appliance 104 may be configured such that, if a virtual tape is moved to the archival virtual tape library 106, corresponding data is stored in the provider archival storage system 110 and that if a virtual tape is moved to the active virtual tape library 108, corresponding data is stored in the provider active storage system 112. In this manner, the client archive system 102 can make data more immediately available by moving a virtual tape from the archival virtual tape library 106 to the active virtual tape library 108. Similarly, the client archive system 102 can archive data by moving a virtual tape from the active virtual tape library 108 to the archival virtual tape library 106.

It should be noted that movement of a virtual tape from one virtual tape library to the other does not necessarily cause data to be removed from a data storage system corresponding to the virtual tape library from which the virtual tape was moved. For instance, in some embodiments, movement from the archival virtual tape library 106 to the active virtual tape library 108 may cause data to be read from the provider archival storage system 110 and transmitted to the provider active storage system 112 for storage, either directly or through the virtual tape library appliance 104. While stored in the provider active storage system 112, the data corresponding to the virtual tape may remain in the provider archival storage system 110 so as to avoid another data transfer once/if the data is to be archived again. Alternatively, once a virtual tape is moved from one virtual tape library to the other, data may be stored in a data storage system corresponding to the virtual tape library to which the virtual tape was moved and deleted from the other data storage system. It should also be noted that the cause of movement of virtual tapes between virtual tape libraries may not be symmetric. For example, referring to the illustrative example of FIG. 1, when a virtual tape is moved from the archival virtual tape library 106 to the active virtual tape library 108, data corresponding to the virtual tape may remain stored in the provider archival storage system 110 while the data is concurrently stored in the provider active storage system 112. However, moving the virtual tape from the active virtual tape library 108 to the archival virtual tape library 106 may cause data corresponding to the virtual tape to be deleted from the provider active storage system 112. Other variations are also considered as being within the scope of the present disclosure.

Figure 2:
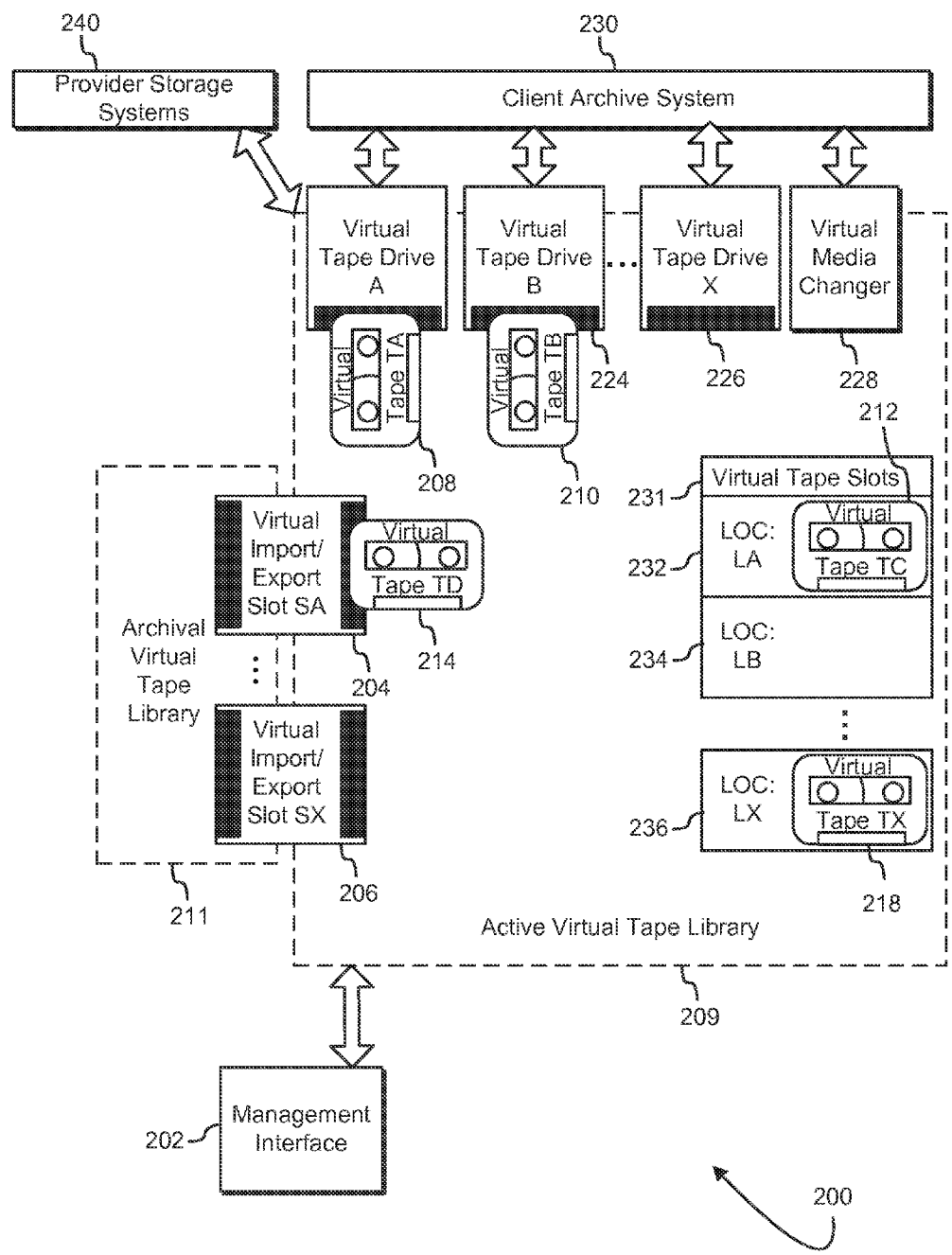
FIG. 2 shows an illustrative example of a virtual tape library system in accordance with at least one embodiment.

Turning now to FIG. 2, a virtual environment 200 of infrastructure of a virtual tape library system is shown. In this example, the infrastructure includes an active virtual tape library 209 and an archival virtual tape library 211. The virtual embodiment of the virtual tape libraries may be implemented using physical infrastructures discussed below. Generally, the active virtual tape library 209 is configured such that data corresponding to virtual tapes is accessible on demand. For example, the data may be obtained in a synchronous response to a request for the data. The archival virtual tape library 211, on the other hand, may be configured for archival storage, and when a virtual tape is virtually located in the archival virtual tape library 211, data corresponding to the virtual tape may not be available on demand. While not illustrated as such in FIG. 2, the client archive system 230 may interface with the client archive system 230, such as to virtually move virtual tapes from the archival virtual tape library 211 to the active virtual tape library 209 for on-demand access of corresponding data.

In one embodiment, a client archive system 230 is configured to interface with a physical tape storage system. In place of the physical system, however, a virtual tape library system provides virtualized physical systems with which the client archive system is configured to communicate, such as a virtual media changer 228, virtual tape drives 222, 224 and 226, virtual import/export slots 204 and 206, virtual tape slots 231 with virtual tape slot locations 232, 234 and 236 and other virtual tape systems as seen in FIG. 2. A client archive system 230 may, through appropriately configured commands, request changes to location through a virtual media changer 228. These associations may include entries in the metadata store for "location," "logical data container ID" and "virtual tape ID." For example, a client may request through the virtual media changer 228 that a virtual tape 214 be moved from a virtual import/export slot 204 to a virtual tape drive 226. In response, a logical data container in a provider active storage system representing a virtual tape 214 may remain physically in the same space, while the virtual tape 214 may be virtually moved from the virtual import/export slot 204 to the virtual tape drive 226 by changing a "location" value of the virtual tape 214 in a metadata store used to track virtual locations of virtual tapes. A virtual tape library appliance may provide interfaces, such as interfaces for virtual tape drives and a virtual media changer, to translate requests from the client archive system to the metadata store or provider storage systems. For example, a virtual tape drive 222 interface may remain the same, but data may be redirected from the interface to a logical data container currently associated with the virtual tape drive in the metadata store. Through use of these virtual systems, a client may create virtual tapes, backup data to virtual tapes, restore data from virtual tapes, store virtual tapes and destroy virtual tapes.

In one embodiment, a client may create a virtual tape. In a physical tape system, physical tapes are not created on-demand, but physically inserted into the physical tape system. However, in the environment 200 of FIG. 2, virtual tapes may be created on demand by requesting a new virtual tape be created from a management system 202. This management system 202 in FIG. 2 may be a part of a virtual tape library appliance or management server, such as described below. In some embodiments, a client may back up data to a virtual tape. The client archive system 230 may request that a virtual tape 208 be moved from a location, such as virtual tape slot location 234 in the virtual tape slots 231, to a virtual tape drive 222 as seen in the active virtual tape library 209 of FIG. 2. The movement of the virtual tape 214 may be represented by a change in a "location" entry for the virtual tape 214 in a metadata store from virtual tape slot location 234 to virtual tape drive 226.

In some embodiments, a client may restore data from a virtual tape. The client archive system 230 may request through a virtual media changer 228 that a virtual tape 208 be moved from a location, such as virtual import/export slot 206, to a virtual tape drive 222 as seen in FIG. 2. The movement of the virtual tape 214 may be represented by a change in a "location" entry for the virtual tape 214 in a metadata store from virtual tape slot location 234 to virtual tape drive 226. A virtual tape drive interface provided by a virtual tape library appliance to the client archive system may be directed to the active storage logical data container associated in the metadata store with the virtual tape 214 in FIG. 2. The client archive system 230 may then perform operations on the virtual tape 214, such as locate, space, read and/or other tape operations. These operations may then be used to determine which data to retrieve from the active storage logical data container. After the restore is complete, the client archive system 230 in FIG. 2 may request the virtual tape 214 be moved from the virtual tape drive 222 to a virtual import/export slot 206 for archival storage or to a virtual tape slot location 234 to await further action.

In one embodiment, a client may store a virtual tape which causes data corresponding to the virtual tape to be physically stored in an appropriate data storage system. The client archive system 230 in FIG. 2 may, through one or more media change commands to the virtual media changer 228, request that a virtual tape 208 be moved from a location, such as virtual tape drive 222, to a virtual import/export slot 206 as represented in a metadata store. The client archive system 230 may issue one or more commands to eject the virtual tape 208 from the virtual import/export slot 206, which may cause one or more operations to be performed at one or more provider storage systems 240, which may include a provider active storage system and provider archival storage system, such as described above. For example, virtually exporting the virtual tape 208 may cause data corresponding to the virtual tape to be archived in a provider archival storage system and/or deleted (or scheduled to be deleted) from a provider active storage system. A virtual tape appliance may cause the operations to be performed through one or more appropriately configured API calls to respective data storage systems. Upon ejection, the virtual tape 208 may then be virtually removed from the active virtual tape library 209 through an update of a metadata store. The movement may cause a provider active storage system to stage an active storage logical data container for transfer to a provider archival storage system as an archival storage logical data container by data servers.

As illustrated in FIG. 2, the active virtual tape library 209 and the archival virtual tape library are connected by one or more virtual import/export slots. For instance, as illustrated in FIG. 2, the active virtual tape library 209 and archival virtual tape library 211 are connected by virtual import/export slots SA 204 through virtual import/export slot SX 206. In an embodiment, the active virtual tape library 209 and archival virtual tape library 211 are considered connected due to a logical connection between the virtual import/export slots. For example, each of the active virtual tape library 209 and archival virtual tape library 211 may have one or more virtual import/export slots that share a common identifier in the active virtual tape library 209 and archival virtual tape library 211. The identifier may be, for instance, the import/export device identifier of the designator field specified in the SMC-3 specification which, for physical devices is typically unique but, in some embodiments, is shared by multiple virtual devices.

Thus, from the perspective of the client archive system 230, ejecting a virtual tape from a connected virtual import/export slot (having an identifier) from one virtual tape library causes the virtual tape to appear in the import/export slot of the other virtual tape library that is identified by the identifier. It should be noted that, to be logically connected by a virtual import/export slot, the virtual import/export slot of the logically connected virtual tape libraries do not necessarily need to share a common identifier. For instance, as an alternative, a virtual import/export slot of one virtual tape library and a virtual import/export slot of another virtual tape library may have different identifiers that are associated with one another by a data store. The association may be maintained by a system implementing the virtual tape libraries, the client archive system 230 and/or another system.

In an embodiment, there are multiple tiers of storage that may be used for logical data containers that support virtual tapes. In some embodiments, as those described above, there may be two tiers, such as provider active storage systems and provider archive storage systems. As the archive storage logical data containers in provider archival storage systems may not have adequate response time and/or may operate asynchronously for some operations, such as data retrieval, virtual tapes (such as virtual tapes 316 and 320 discussed below in connection with FIG. 3) may be represented to the client archive system 230 as being located in the archival virtual tape library 211, as seen in FIG. 2. A third tier of storage with a smaller response time than the archival storage logical data container, but longer response time than the active storage logical data container, may be represented as locations in yet another virtual tape library, which is not illustrated. As the client archive system 230 may be tolerant of requests to load a virtual tape 212 into a virtual tape drive 226 in FIG. 2 that takes minutes, a logical data container in the third storage tier may be transferred to a higher storage tier, such as to an active storage logical data container and associated with a virtual tape drive 226 in FIG. 2. This third tier may allow the client to have a smaller cost for storage that is quickly available, but less expensive than storage that provides data access that is readily available.

In another embodiment, a client may destroy a virtual tape. In FIG. 2, a virtual tape 214 may be virtually moved to a virtual import/export slot 204. This virtual movement may be accomplished through an association in a metadata store of a virtual tape ID with a location and an active storage logical data container. The virtual tape 214 in FIG. 2 may then be removed from the active virtual tape library 209 by removing location information from a metadata. The active storage logical data container associated with the virtual tape 214 may then be deprovisioned by a data server in a data storage system where the data corresponding to the virtual tape 214 is stored. Depending on the embodiment and the client archive system, the metadata store may or may not delete the entry for the virtual tape 214.

Figure 3:
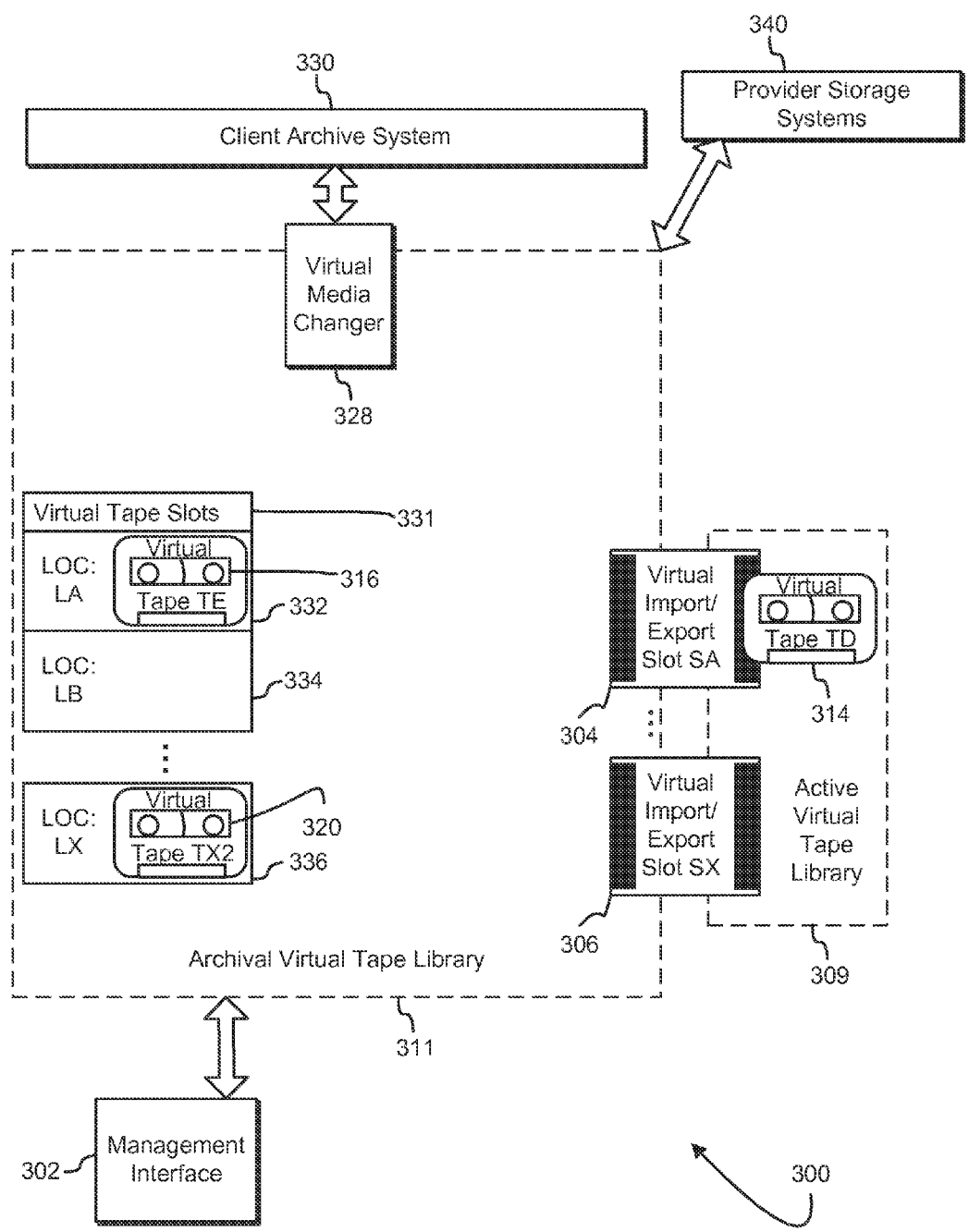
FIG. 3 shows an illustrative example of a virtual tape library system, which may be the virtual tape library system of FIG. 2, in accordance with at least one embodiment.

In FIG. 3, a virtual environment 300 of infrastructure of a virtual tape library system is shown. The virtual environment 300 may be the environment 200 discussed above in connection with FIG. 2, but with greater detail illustrated for the archival virtual tape library 211 and less detail illustrated for the active virtual tape library 209. Accordingly, as illustrated in FIG. 1, the virtual environment 300 includes an active virtual tape library 309 (which may be the active virtual tape library 209 discussed above in connection with FIG. 2) and an archival virtual tape library 311 (which may be the archival virtual tape library 211 discussed above in connection with FIG. 2). As illustrated in FIG. 3, the archival virtual tape library 311 includes virtual components that are the same as or similar as like-named components discussed above in connection with FIG. 2. For instance, as illustrated in FIG. 3, the archival virtual tape library 311 is configured to communicate with a management interface 302, such as described above and includes virtual tape slots 331 with virtual tape slot locations 332, 334 and 336, such as described above. Further, the archival virtual tape library includes virtual import/export slots 304 and 306, which may be as described above. For example, as illustrated, the virtual import/export slots 304 and 306 may be logically connected to the active virtual tape library so that virtual tapes are moveable between the archival virtual tape library 311 and the active virtual tape library 309. A virtual media change 328 is configured to interface with the client archive system 330 to virtually move virtual tapes 314 and 316 among the various components of the archival virtual tape library.

Further, as illustrated in FIG. 3, the archival virtual tape library 311 is configured to interface with provider storage systems 340, such as described above. For instance, when a virtual import/export slot 304 or 306 is used to virtually move a virtual tape to the archival virtual tape library, the archival virtual tape library 311 (through a virtual tape appliance supporting the archival virtual tape library 311) may transfer data corresponding to the virtual tape to a provider archival storage system, if the provider archival storage system of the provider storage systems 340 does not already store the data. Further, a metadata store may be updated to reflect the virtual movement of the virtual tape.

As with all environments described herein, variations are considered as being within the scope of the present disclosure. For instance, while FIGS. 2-3 show virtual environments having two virtual tape libraries, various embodiments of the present disclosure may utilize more than two virtual tape libraries. The virtual tape libraries may be connected in a chain or mesh through virtual import/export slots. Media changer commands may be issued to the appropriate virtual tape library to move virtual tapes from one virtual tape library to the next. Further, while FIGS. 2-3 show virtual import/export slots connecting the virtual tape libraries illustrated in the figures, additional virtual import/export slots may connect other components of a virtual environment, such as a virtual tape shelf (not shown). Virtually exporting a virtual tape to a virtual tape shelf may cause data corresponding to the virtual tape to be transferred to archival storage (if not already stored in archival storage) and a corresponding update to a metadata store that tracks the virtual locations of virtual tapes.

Figure 4:
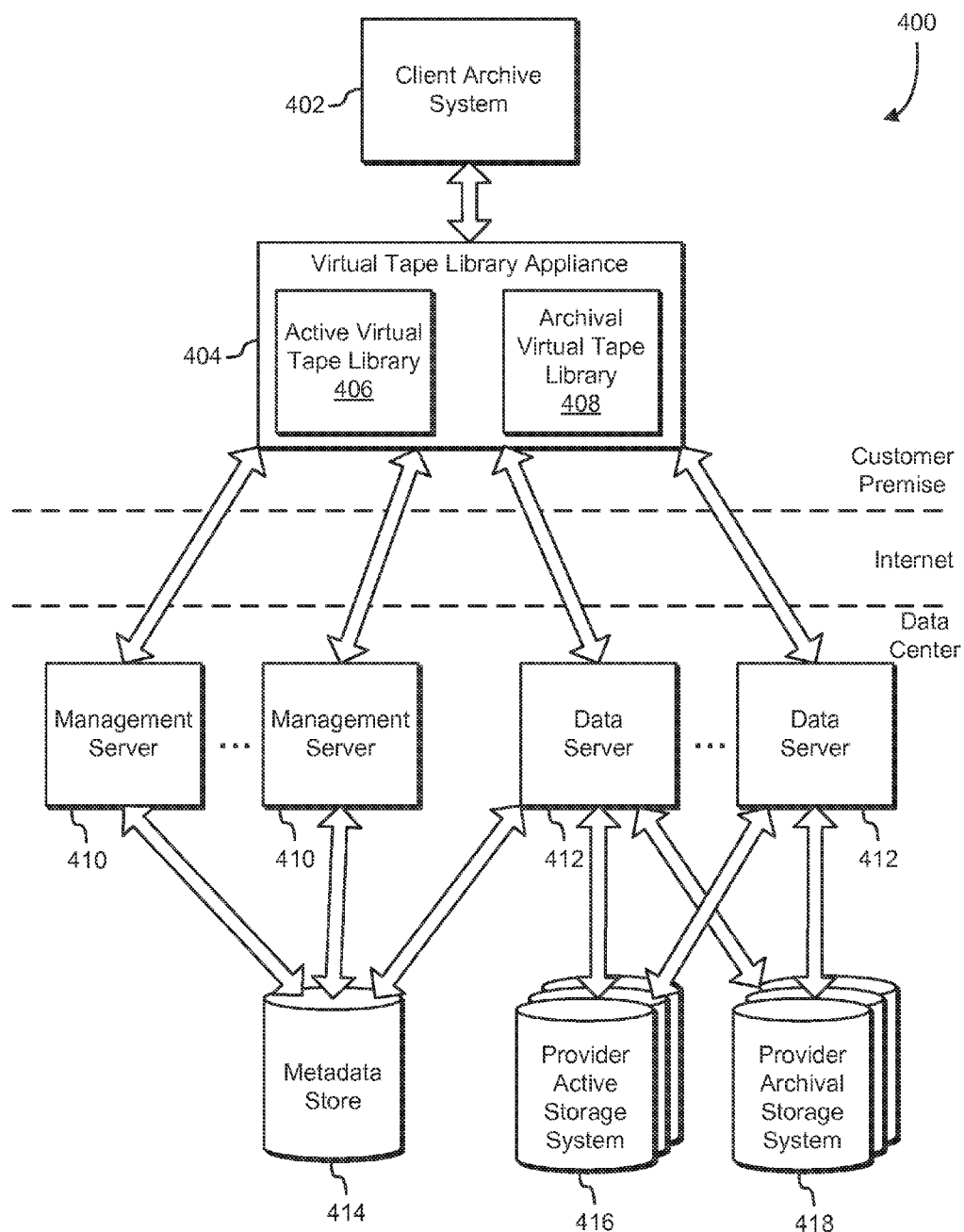
FIG. 4 shows an illustrative example of a virtual tape library system in accordance with at least one embodiment.

FIG. 4 shows an illustrative example of an environment 400 which may be used to implement the virtual environments shown in FIGS. 2-3. The environment 400 includes a client archive system 402 which may operate such as the client archive systems described above.

Briefly, the client archive system 402 is configured to interface with a virtual tape library appliance 404 as if the virtual tape library appliance 404 was a physical tape system. The virtual tape library appliance 404 may, for instance, be configured to receive commands, such as SCSI commands from the client archive system 402, and when appropriate, issue appropriately configured API calls to other systems in order to perform virtual tape operations. It should be noted that, while FIG. 4 shows the virtual tape library appliance 404 as hosted on customer premises, the virtual tape library appliance may be hosted in other locations, such as the provider's premises. Commands to the virtual tape library appliance 404 may be configured accordingly. For instance, iSCSI commands may be used by the client archive system 402 to communicate with the virtual tape library appliance 404.

As illustrated in FIG. 4, the virtual tape library appliance supports virtual environments for an active virtual tape library 406 and an archival virtual tape library 408. The active virtual tape library 406 and archival virtual tape library 408 may be virtual tape libraries such as discussed above. The client archive system 402 can issue commands to the virtual tape library appliance and the virtual tape library will take appropriate actions to modify the virtual tape libraries, as appropriate, such as described below.

As illustrated in FIG. 4, a number of components support implementation of the virtual tape library appliance 404. For example, as illustrated, one or more data centers of a provider host one or more management servers 410 and one or more data servers. The virtual tape library appliance 404 may communicate with the management servers 410. The management servers 410 may be configured to interface with a metadata store 414, which as described above, serves of a repository of information indicative of the current state of a virtual tape library for the customer. The metadata store 414 may store the states of one or more virtual tape libraries for one or more customers of the provider. When a client archive system 402 communicates with the virtual tape library appliance 404 to change the location of a virtual tape in a virtual tape library (or move a virtual tape between virtual tape libraries), the virtual tape appliance (via a computing system implementing the virtual tape library) may communicate with a management server 410 to cause the management server 410 to record the change in the metadata store.

The data server 412 may be configured to enable the virtual tape library appliance 404 to utilize services of a provider active storage system 416 and provider archival storage system, which may be storage systems such as described above. The data server 412 may be configured, for example, to translate commands from the virtual tape library appliance 404 to appropriately configured API calls of the respective storage systems. For instance, when a virtual tape is virtually ejected to an archival virtual tape library, if the data corresponding to the virtual tape is not already in the provider archival storage system, the virtual tape library appliance may send a command to a data server 412 which may transmit an appropriate API call to the provider archival storage system 418 to store the data in the provider archival storage system 418. The data server 412 may also transmit an appropriate API call to the provider active storage system 416 to cause the provider active storage system 416 to delete data corresponding to the tape so that, for instance, the customer does not incur further charges for storage of the data in the provider active storage system 416 until the data is once again loaded into the provider active storage system 416 as a result of a virtual tape move. By loading the data into the provider active storage system, the data may be read from the provider archival storage system 418 and transmitted to the provider active storage system 416 for storage by the provider active storage system 416. In some embodiments, loading the data into the provider active storage system 416 also includes deleting the data from the provider archival storage system 418. In other embodiments, the data may be deleted from the provider archival storage system 418 once transmitted to the provider active storage system 416.

Similarly, when a virtual tape is virtually moved to an active virtual tape library, a data server 412 may transmit an appropriate API call to the provider archival storage system 418 to retrieve data corresponding to the virtual tape. If the provider archival storage system operates asynchronously, the data server 412 may transmit another appropriate API call to the provider archival storage system 418 to obtain the retrieved data. Once the data is available from the provider archival storage system 418, the data server 412 may, through an appropriate API call to the provider active storage system 416, cause the provider active storage system 416 to store the data. In this manner, should the customer issue a command to read the virtual tape from a virtual tape drive, the virtual tape library appliance 404 can command a data server 412 to provide the data from the provider active storage system 416.

It should be noted that variations of the environment 400 are considered as being within the scope of the present disclosure. For example, in some embodiments, management servers 410 and/or data server 412 are absent from the environment. In such embodiments, the virtual tape library appliance 404 may be configured to transmit commands to the metadata store 414, provider active storage system 416 and/or provider archival storage system 418 directly. The virtual tape library appliance may, for instance, generate and transmit appropriately configured API calls in accordance with commands received from the client archive system 402.

As noted above, in various embodiments, a virtual tape's virtual location in a virtual tape library corresponds to data associated with the virtual tape being stored in a data storage system corresponding to the virtual tape library. In the examples illustrated in the figures, one virtual tape library corresponds to data storage in an archival data storage system and another virtual tape library corresponds to data storage in an active data storage. While these two correspondences are used for the purpose of illustration, other embodiments may include additional correspondences. For example, there may be more than two virtual tape libraries logically connected by virtual media changers, each corresponding to a different data storage system. When a virtual tape is virtually located in a virtual tape library, data corresponding to the virtual tape may be stored in a data storage location corresponding to the virtual tape library, and possibly in one or more others. As discussed above, when a virtual tape is moved to a virtual tape library, a metadata store may be updated to reflect the movement. The metadata store (or another data store) may also be updated to indicate the location of data corresponding to the virtual tape. The metadata store may record, for instance, enough information to enable access to the data from the data storage system corresponding to the virtual tape library in which the virtual tape is located.

The metadata store may also maintain associations of virtual tapes with the locations of data in one or more data storage systems which do not correspond to a virtual tape library in which the virtual tape is virtually located. For instance, as noted, when a virtual tape is moved from an archival virtual tape library to an active virtual tape library, data corresponding to the virtual tape may be read, but not deleted from an archival data storage system and loaded (i.e., written to) an active data storage system. The metadata store may be updated to reflect the association of the virtual tape's data with information enabling access of the data in the active data storage system. The metadata store may also keep associated the virtual tape's data with information enabling access of the data from the archival data storage system. In this manner, when a virtual tape is virtually moved from the active virtual tape library to the archival virtual tape library, data corresponding to the virtual tape does not need to be retransferred to the archival data storage system if the data has already been transferred to the archival data storage system as a result of a virtual move of the virtual tape to the archival virtual tape library.

Figure 5:
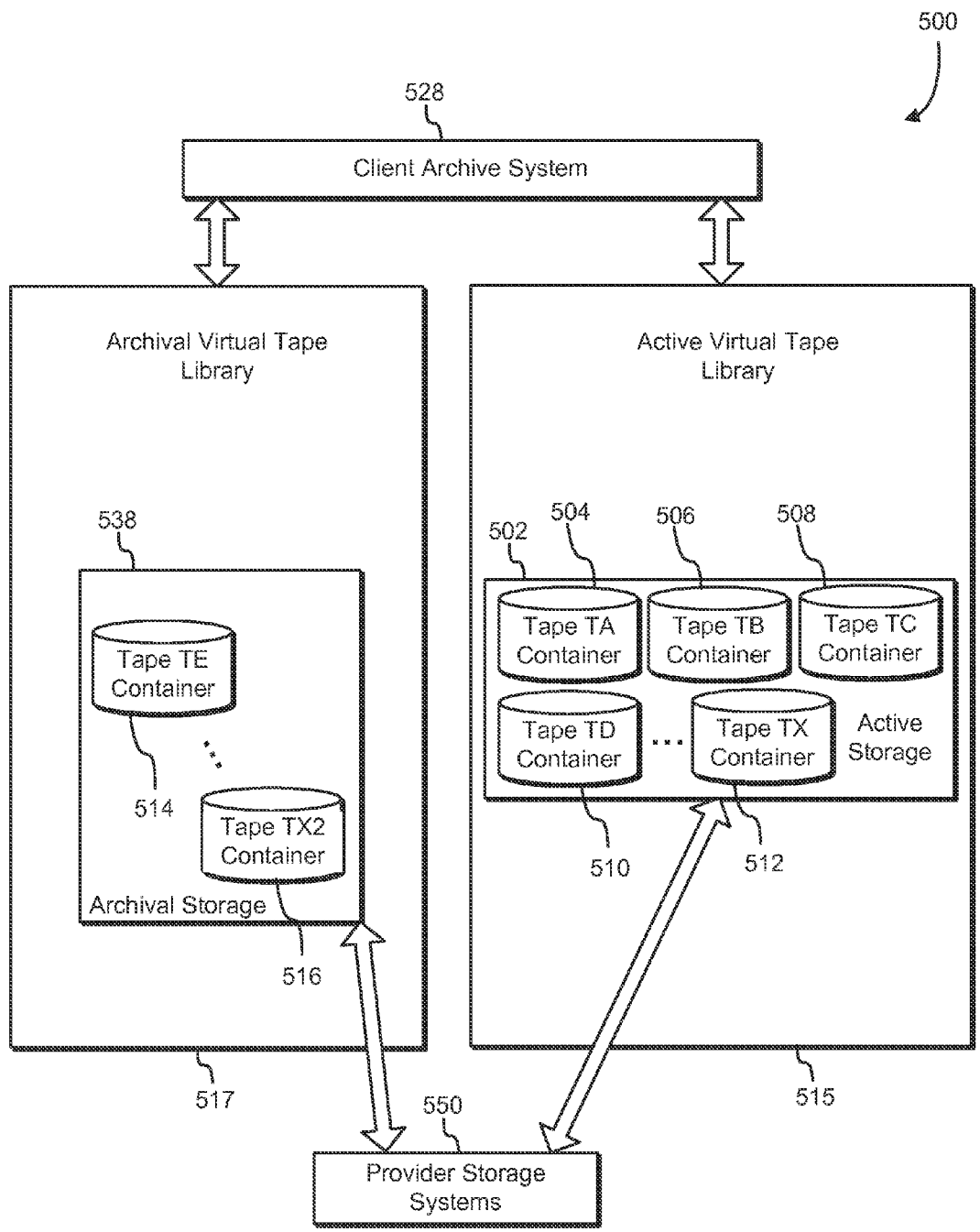
FIG. 5 shows an illustrative example of a virtual tape library system in accordance with at least one embodiment.

FIG. 5 illustrates a mapping of virtual locations in virtual tape libraries with locations in data storage systems in accordance with various embodiments. Mappings, provided by the metadata store 414 in FIG. 4, are shown being contained by virtual locations in FIG. 4. Virtual mappings of virtual tapes 208, 210, 212 and 214 illustrated in FIG. 2 correspond to mappings of logical data containers 504, 506, 508, 510 and 512. In other words, when a virtual tape is virtually located in the active virtual tape library, the virtual tape is mapped (either directly or indirectly) to data stored in active storage of an active data storage system, that is, data that is readily accessible relative to archival storage of an archival data storage system. Virtual mappings of virtual tapes 316 and 320 correspond to mappings of logical data containers 514 and 516. Thus, when a virtual tape is virtually located in the archival virtual tape library, the virtual tape is mapped to data stored in archival storage of an archival data storage system. The active virtual tape library 515, when updated in certain ways, causes updates in the active storage 502 to be made through an appropriate component of the provider storage systems 550. For example, if a virtual tape is moved to the active virtual tape library, a system implementing the active virtual tape library may transmit data corresponding to the tape to be transmitted to active storage through an appropriately configured API call to a server of the provider storage systems 550.

Logical data containers in the archival storage 538 may also be manipulated through the provider storage systems 540. Data of logical data containers may be transferred between the archival storage 538 and active storage 502 through the provider storage systems 540, either directly or through a system implementing the virtual tape libraries 515, 517. Logical data containers in active storage 502 may be seen as available to the active virtual tape library 515 and the client archive system 528. In some embodiments, volumes in archival storage 538 may be seen as unavailable until moved to active storage 502 through virtual movement of corresponding virtual tapes.

Figure 6:
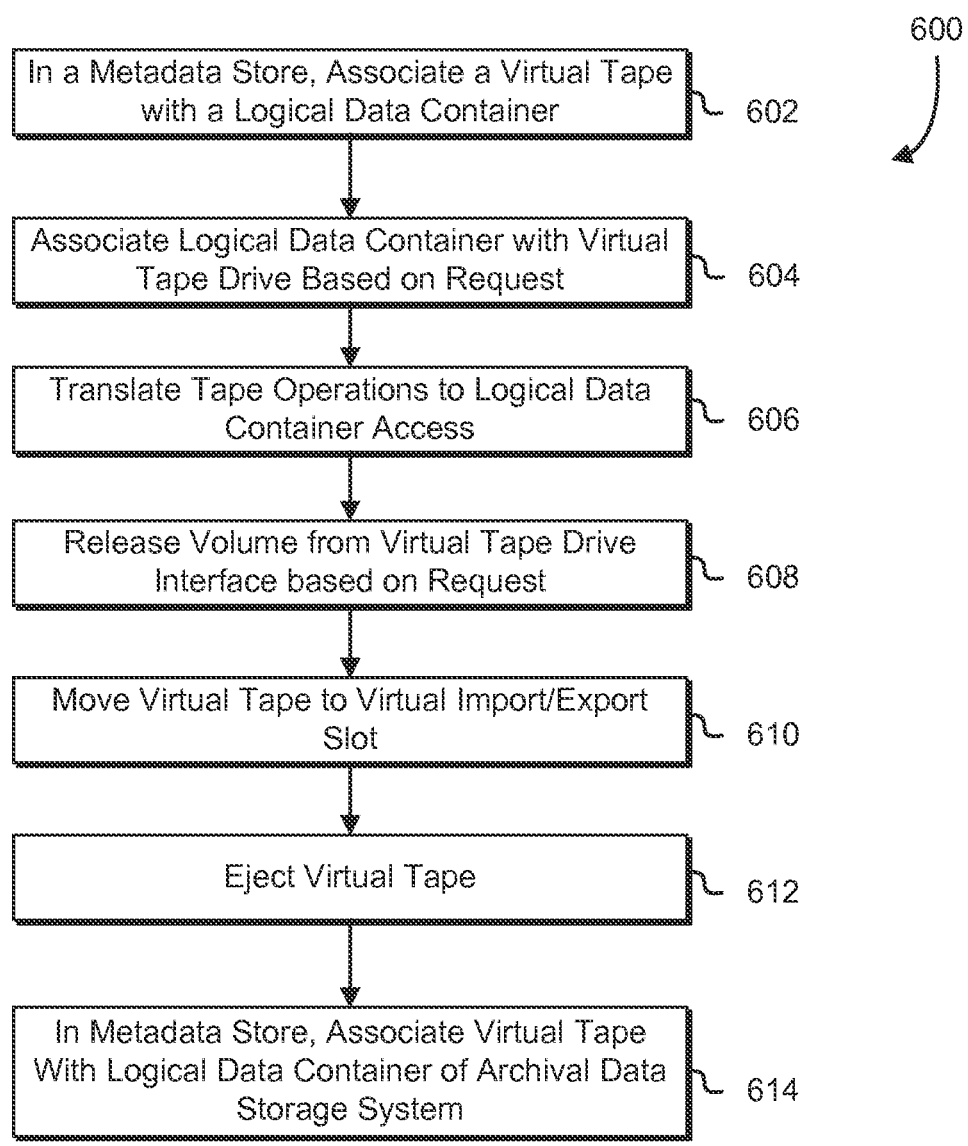
FIG. 6 shows an illustrative example of a process that may be used to operate a virtual tape library system in accordance with at least one embodiment.

Turning now to FIG. 6, an illustrative example of a process 600 that may be used to operate a virtual tape library system in accordance with at least one embodiment is shown. This process 600 may be accomplished collectively by appropriate computing resources such as those shown in FIG. 4, including a client archive system 402, virtual tape library appliance 404, management servers 410, data servers 412, metadata store 414, provider active storage systems 416 and provider archival storage system 418. As illustrated in FIG. 6, a virtual tape may be created by storing 602 an association in a metadata store between the virtual tape and a logical data container of a provider active storage system. The virtual tape may then be associated 604 with a virtual tape drive in an active virtual tape library. Associating the virtual tape with the virtual tape drive may be performed in any suitable manner, such as by a metadata store, as described above in connection with FIG. 4. The virtual tape drive association may cause an instigation of an I/O path between a client archive system and the logical data container. A virtual tape library appliance may translate 606 tape operations requested by the client archive system to access the logical data container associated with the virtual tape loaded in the virtual tape drive. The virtual tape library appliance may, for instance, translate write commands to API calls to store data. As another example, a seek operation requesting the fourth record from the beginning of tape (BOT) may be translated to a logical data container request for global record flags metadata in the global header of the logical data container to scan for the fourth record flag set to true. The location of the fourth record flag set to true may then be used to calculate the record location in the logical data container and set a tape head location in a journal in the global header to the record location.

After the tape operations requested by the client archive system are completed, the virtual tape may be moved from the virtual tape drive to another location in the virtual tape library. A virtual tape appliance may, for instance, receive commands to a virtual media changer of the active virtual tape library. By moving the virtual tape, the logical data container may be released 608 from the virtual tape drive I/O interface. For example, a request to move the virtual tape to a different location may cause the association of the virtual tape and the virtual tape drive may be removed from the metadata store. A routing of I/O requests by the virtual tape drive I/O interface may also be removed, such that no further I/O requests are routed to the logical data container associated with the virtual tape.

As illustrated in FIG. 6, the process may include moving 610 the virtual tape to an import/export slot that connects the active virtual tape library to an archival virtual tape library. Moving 610 the virtual tape may include updating the metadata store to indicate the new virtual location of the virtual tape. Moving 610 the virtual tape may be as a result of a virtual tape appliance having received a command from a client archive system to make the move. Once virtually located in the import/export slot 610, the process 600 may include ejecting 612 the virtual tape, which may be performed as a result of receiving, at a virtual tape appliance, a command to eject the virtual tape. As noted above, ejection of the virtual tape, by virtue of the virtual import/export slot connecting the active virtual tape library with the archival virtual tape library, cause the tape to virtually move into the archival virtual tape library. Accordingly, the process 600 may include associating 614, in the metadata store, the virtual tape with a logical data container of an archival data storage system. In addition, the process 600 may include transferring data corresponding to the virtual tape from the active data storage system to the archival data storage system.

Figure 7:
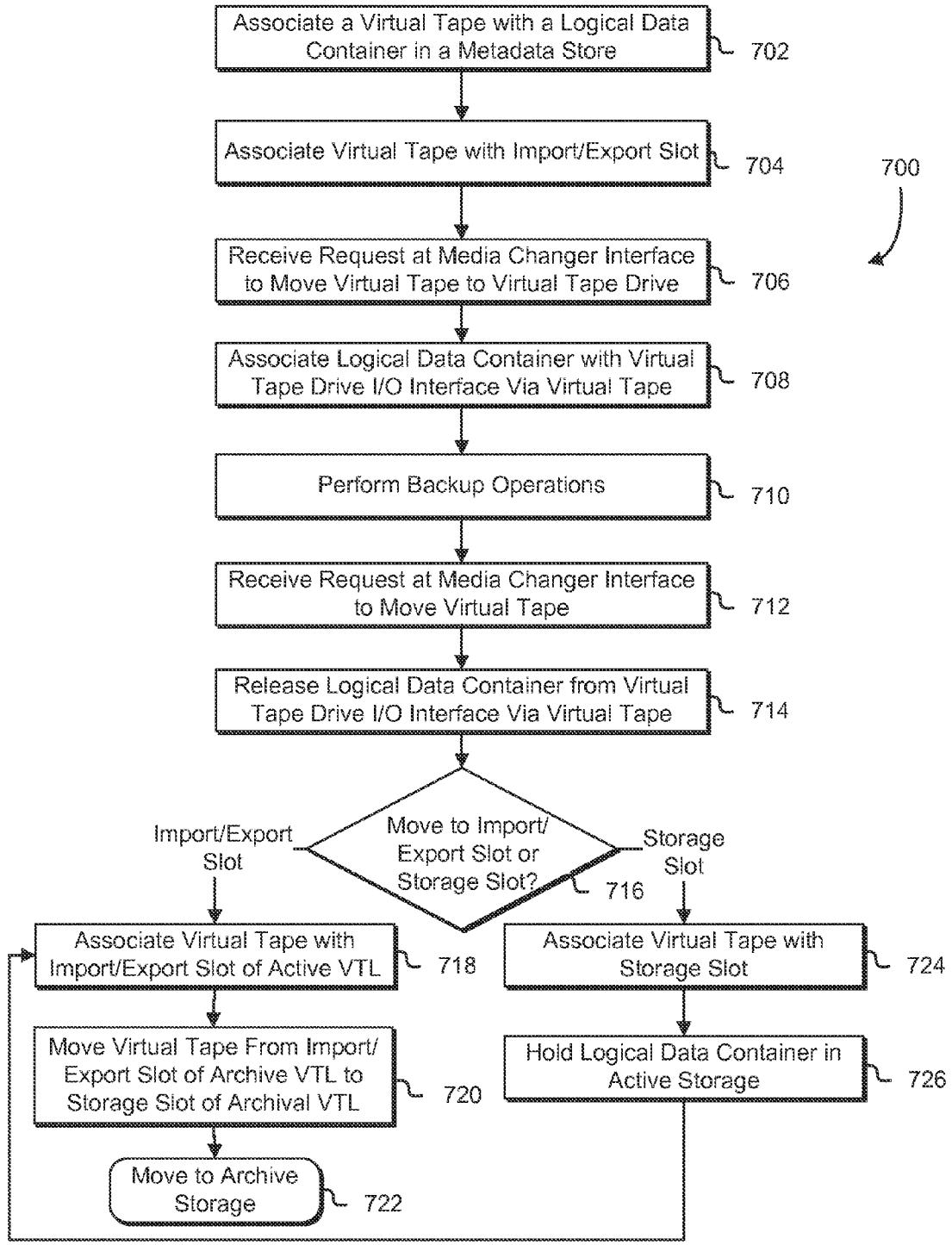
FIG. 7 shows an illustrative example of a process that may be used to back up to a virtual tape library system in accordance with at least one embodiment.

FIG. 7 shows an illustrative example of a process that may be used to back up to a virtual tape library system in accordance with at least one embodiment. This process 700 may be accomplished collectively by computing resources such as those shown in FIG. 4, including a client archive system 402, virtual tape library appliance 404, management servers 410, data servers 412, metadata store 414, provider active storage systems 416 and provider archival storage system 418. A virtual tape may be created by associating 702 the virtual tape with a logical data container in a metadata store. The virtual tape may then be virtually loaded in a virtual import/export slot by associating 704 the virtual tape with the virtual import/export slot in the metadata store. The virtual tape library appliance may receive 706 a request through a media changer interface to move a virtual tape to a virtual tape drive. In response to this request, a logical data container associated with the virtual tape may also be associated 708, via the virtual tape, with a virtual tape drive I/O interface of the virtual tape drive. The client archive system may then perform 710 backup operations, which may include initializing the logical data container if not yet initialized. After backing up data, the media changer interface may receive 712 a request from the client archive system to move the virtual tape from the virtual tape drive. In response to this request, the logical data container may be released 714 from the virtual tape drive I/O interface via the virtual tape. If the logical data container is to be moved 716 to the import/export slot, the virtual tape may be moved to a virtual import/export slot, causing an association 718 with the logical data container, virtual import/export slot and virtual tape in the metadata store. The virtual tape may then be removed from the virtual tape library by moving the virtual tape to an archival virtual tape library and the metadata store may be updated accordingly. For example, virtually moving the virtual tape from the virtual import/export slot of the active virtual tape library may cause the virtual tape to virtually appear in the import/export slot of the archival virtual tape library. Accordingly, the process 700 may include virtually moving 720 the virtual tape from the import/export slot of the archival virtual tape library and updating a metadata store accordingly. Movement of the virtual tape may be automated or in response to a request to make the movement. Once the virtual tape is virtually located in the archival virtual tape library, the data of the logical data container corresponding to the virtual tape may be staged for and transferred 722 to archival storage. Movement of the data to archival storage, in various embodiments, may occur before, during or after movement of the virtual tape from the virtual import/export slot of the archival virtual tape library to the storage slot of the virtual tape library.

However, if the virtual tape is to be moved 716 to the storage slot such that it remains readily available, the virtual tape may be associated 724 with a library location in the metadata store and held 726 in active storage. After holding in active storage, the virtual tape library appliance may receive a request to send the logical data container to archival storage. The virtual tape may then be associated with the import/export slot 718 and data associated with the virtual tape may be moved 722 to archival storage. In some embodiments, the request is implied by associating the virtual tape with the import/export slot.

Figure 8:
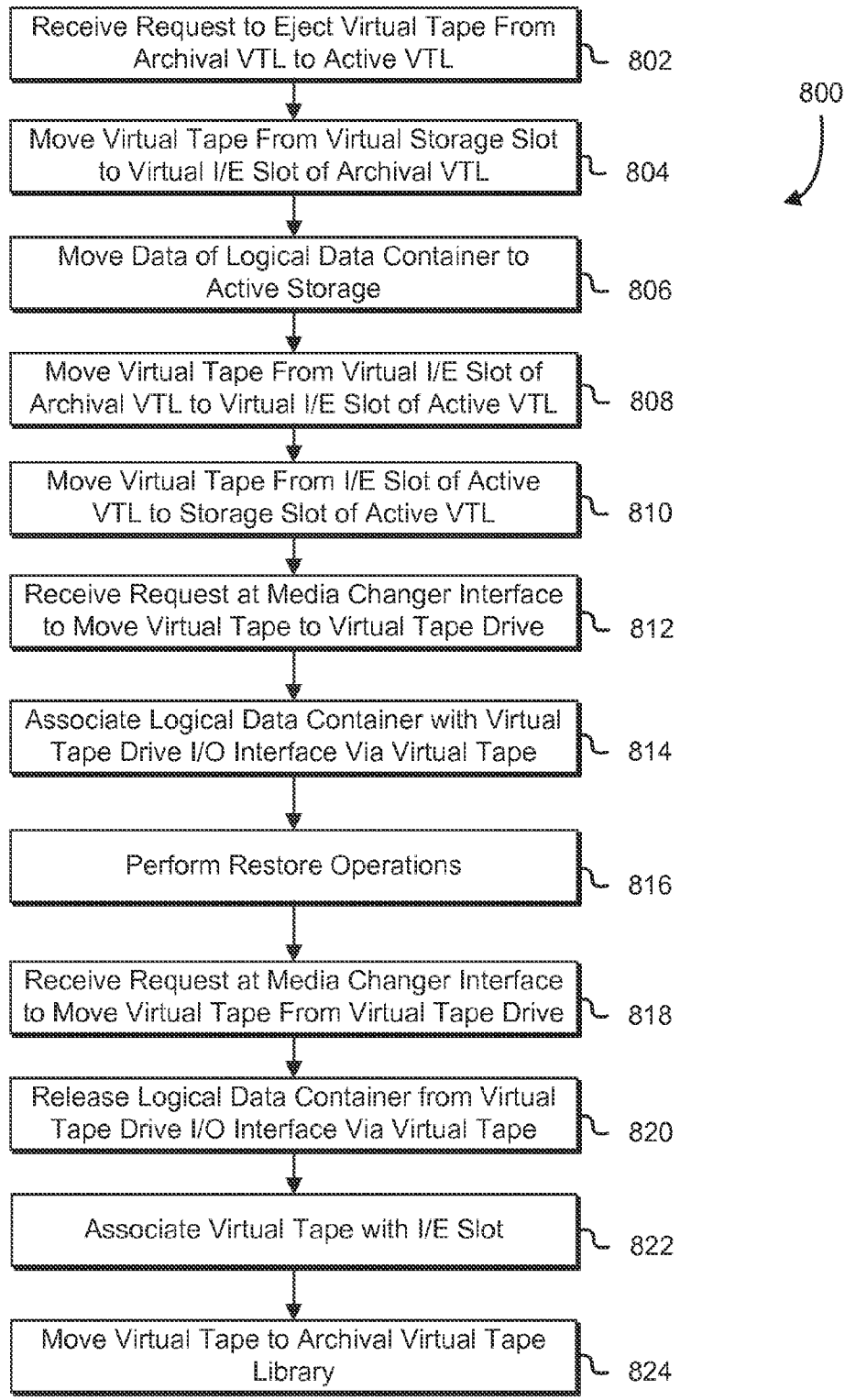
FIG. 8 shows an illustrative example of a process that may be used to restore from a virtual tape library system in accordance with at least one embodiment.

Similar operations may be performed to prepare a virtual tape to restore to the client archive system as seen the process 800 illustrated in FIG. 8. As illustrated, the process 800 includes receiving 802 a request to eject a virtual tape from an archival virtual tape library ("VTL" in the figure) to an active virtual tape library. The request may be received, for instance, by a virtual tape appliance from a client archive system. As a result of receiving 802 the request, the process 800 may include moving 806 data of the logical data container corresponding to the virtual tape to active storage and virtually moving 806 the virtual tape from its virtual storage slot (e.g., one of the virtual tape slot locations 332, 334 or 336) of the archival virtual tape library to a virtual import/export ("I/E" in the figure) slot of the archival virtual tape library. The virtual tape may then be moved 808 from the virtual import/export slot of the archival virtual tape library to a virtual import/export slot of the active virtual tape library. As noted above, the virtual import/export slot of the archival virtual tape library and the virtual import/export slot of the active virtual tape library may be logically connected, such as by sharing a common identifier (e.g., an identifier used by the SCSI protocol) or by having distinct identifiers (without a common identifier) that are logically linked to one another by association with one another in a data store (e.g., a metadata store). By moving the virtual tape to the virtual import/export slot of the archival virtual tape library, a system implementing the virtual tape libraries may cause the virtual tape to appear in the connected virtual import/export slot of the active virtual tape library. The virtual tape may appear in the virtual import/export slot of the active virtual tape library after a period of time, such as the time it takes to move data corresponding to the virtual tape from an archival data storage system to an active data storage system. Thus, the virtual tape may appear in the virtual import/export slot of the active virtual tape library when data corresponding to the virtual tape is unavailable for immediate access, e.g., unavailable to be provided in a synchronous response to a request.

As illustrated in FIG. 8, the process may also include moving 810 the virtual tape from the virtual import/export slot of the active virtual tape library to a storage slot of the active virtual tape library, such as one of the virtual tape slot locations 232, 234 or 236. It should be noted that the operations of moving the virtual tape from a storage slot of the archival virtual tape library to a storage slot of the active virtual tape library, through import/export slots of the virtual tape libraries, may be performed collectively in response to the received 802 request to eject the virtual tape from the archival virtual tape library to the active virtual tape library; however, some or all of the operations may be performed as individual responses to additional received requests. Further, as noted above, virtual movement of a virtual tape into the active virtual tape library may cause data corresponding to the virtual tape to be loaded into an active data storage system.

In an embodiment, the process 800 includes receiving 812, at a media changer interface, a request to move the virtual tape to a virtual tape drive. As a result of receiving 812 the request, the process 800 may include associating 814 a logical data container backing the virtual tape (i.e., corresponding to the virtual tape) with the virtual tape dive I/O interface via the association of the virtual tape with the virtual tape drive. The client archive system may then perform restore operations 816 on the virtual tape, such as locate, space, read or other tape operations. These restore operations may then be used to determine which data to retrieve from the logical data container.

After the restore is complete, a request may be received 818 from the client archive system to move the virtual tape from the virtual tape drive to the virtual import/export slot. As a result of receiving 818 the request, the process 800 may include releasing 820 the virtual tape from the virtual tape drive I/O interface via the disassociation of the virtual tape from the virtual tape drive. The virtual tape may be associated 822, in a metadata store, with the I/E slot and the virtual tape may be moved 824 to the archival virtual tape library, such as described above. If applicable, the process 800 may also include storing data corresponding to the virtual tape in an archival data storage system.

Figure 9:
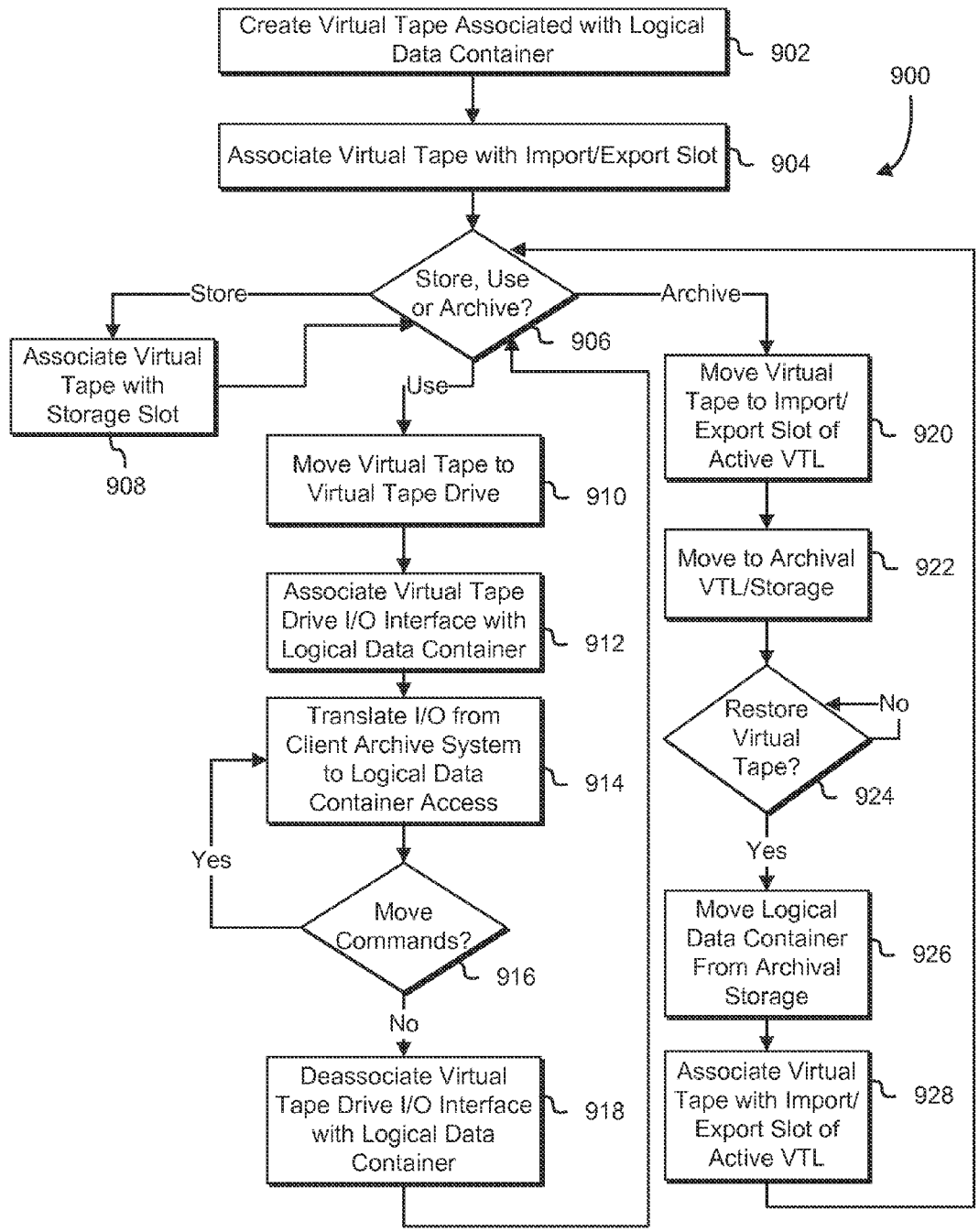
FIG. 9 shows an illustrative example of a process that may be used to operate a virtual tape library system in accordance with at least one embodiment.

Turning now to FIG. 9, an illustrative example of a process 900 that may be used to operate a virtual tape library system in accordance with at least one embodiment is shown. This process 900 may be accomplished by computing resources, such as those shown in FIG. 4, including a client archive system 402, virtual tape library appliance 404, management servers 410, data servers 412, metadata store 414, provider active storage systems 416 and provider archival storage system 418. A new virtual tape may be created 902 by provisioning a logical data container in a storage service and associating the logical data container with a virtual tape in a metadata store. The virtual tape may then be associated 904 with a virtual import/export slot in the metadata store. Now that the virtual tape is available to the client archive system, the client archive system may decide whether 906 to store, archive or use the virtual tape. After creation of a new tape, the client archive system may request the tape be used for backup. The client archive system may request the virtual tape be moved 910 to a virtual tape drive through a media changing interface. This virtual move causes the metadata store to associate 912 a logical data container associated with the virtual tape with a virtual tape drive I/O interface. The virtual tape library appliance may then translate 914 tape I/O commands from the client archive system to logical data container access commands. As long as the client archive system sends 916 commands, the virtual tape library appliance may continue to translate the commands for the logical data container. After the client archive system commands are complete 916, the virtual tape and corresponding logical data container may be dissociated 918 with the virtual tape drive I/O interface. The client archive system may then return to deciding whether 906 to archive, use or store the virtual tape. If the virtual tape is to be stored 906, the virtual tape may be associated with a virtual library location 908 to await further action to be used, stored or archived 906.

If the virtual tape is selected 906 to be archived, the virtual tape may be moved to a virtual import/export slot 920 of the active virtual tape library. The virtual tape may then be removed from the virtual library to an archival virtual tape library and the logical data container associated with the virtual tape moved 922 to archival storage. The logical data container may stay in archival storage until the virtual tape and/or logical data container is requested to be restored 924 back into the virtual tape library and the associated active storage. Once the logical data container is moved 926 from archival storage, the virtual tape may be associated 928 with a virtual import/export slot in the active virtual tape library. The virtual tape may then be stored, used or archived 906, such as described above.

As noted, variations of embodiments explicitly described are considered as being within the scope of the present disclosure. For example, various embodiments are described with specific details that may not be necessary in all embodiments. As an example, the present disclosure discusses virtual tapes implemented by a system that operates as a virtual version of a physical tape system. The scope of the present disclosure, however, is not limited to tapes and virtualizations thereof. Techniques described herein may be applicable to other types of storage media and generally, virtualizations of physical data storage containers, such as magnetic drives with spinning media (e.g., platters), solid state drives (SSDs) and/or others. Further, while specific command sets and protocols are discussed for the purpose of illustration, the techniques described herein are applicable to command sets and protocols in addition to those explicitly mentioned.

Figure 10:
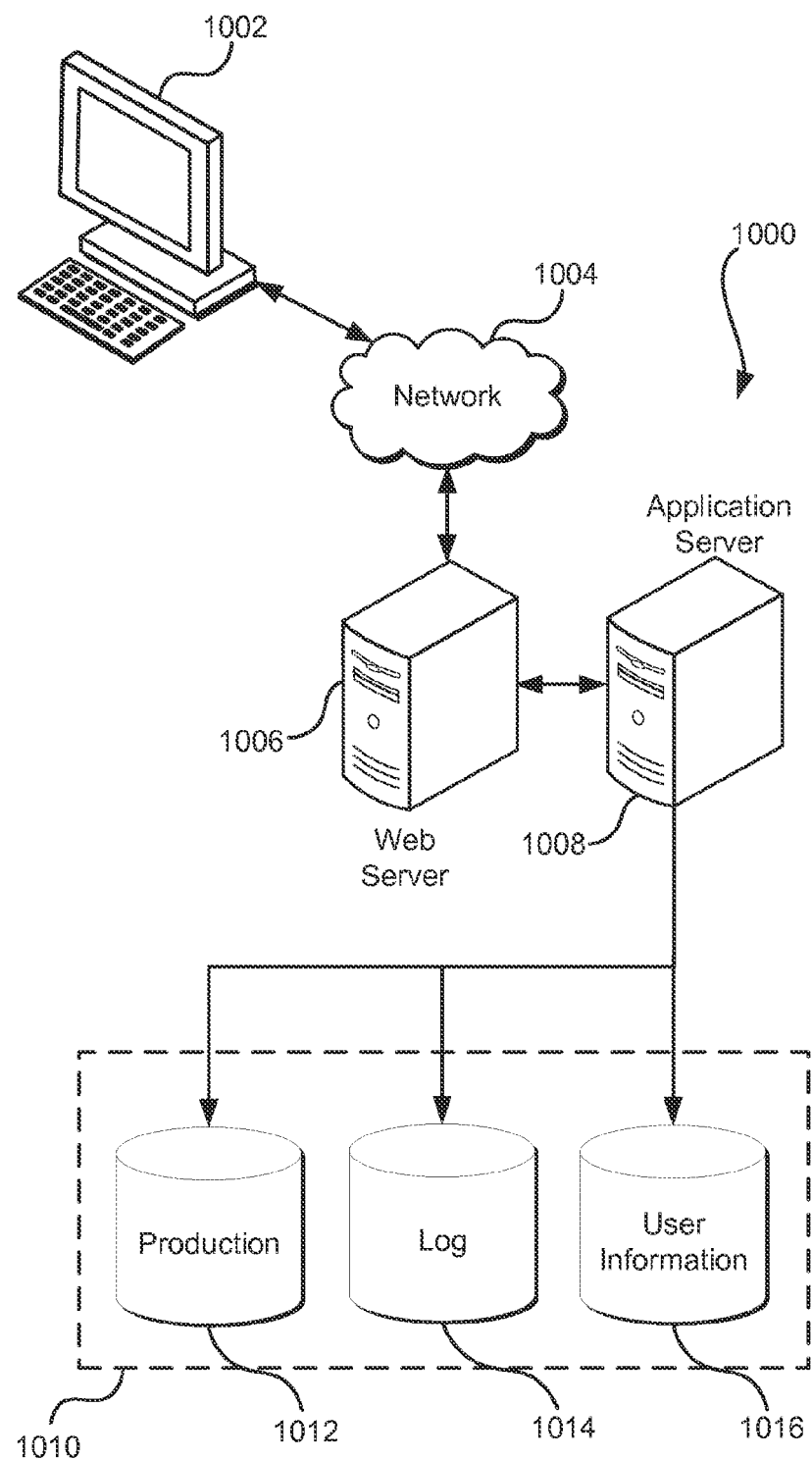
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend, at least in part, upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes, such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices, such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information, such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
      receiving a first request for a first virtual media changer to move a virtual tape to a first element of a first virtual tape library;
      as a result of receiving the first request:
         causing data corresponding to the virtual tape to be accessed from a first data storage system and stored in a second data storage system, the first data storage system providing synchronous access to data and the second data storage system providing asynchronous access to data; and
         updating a data store to indicate the virtual tape being located in a second element of a second virtual tape library.

2. The computer-implemented method of claim 1, wherein the first element is a virtual import/export slot.

3. The computer-implemented method of claim 1, wherein the first element and the second element share a common identifier.

4. The computer-implemented method of claim 1, wherein the first request includes a first small computer system interface (SCSI) command.

5. The computer-implemented method of claim 1, further comprising:
   receiving a second request or a second virtual media changer to move the virtual tape to the second element; and
   as a result of receiving the second request:
      updating the data store to indicate the virtual tape being located in the first element of the first virtual tape library; and
      causing data corresponding to the virtual tape to be accessed from the second data storage system and stored in the first data storage system.

6. The computer-implemented method of claim 5, wherein causing data corresponding to the virtual tape to be accessed from the second data storage system and stored in the first data storage system includes deleting the data corresponding to the virtual tape from the second data storage system.

7. The computer-implemented method of claim 5, wherein upon storing the data corresponding to the virtual tape in the first data storage system, the data corresponding to the virtual tape remains in the second data storage system.

8. The computer-implemented method of claim 1, wherein the first element and the second element are logically linked without sharing a common identifier.

9. A computer-implemented method, comprising:
   under the control of one or more computer systems configured with executable instructions,
      receiving a first request for a first virtual media changer to move a virtual medium to an element of a first virtual media library; and
      as a result of receiving the first request:
         updating a data store to indicate the virtual medium being located in a second virtual media library; and
         causing data corresponding to the virtual medium to be accessed from a first data storage system corresponding to the first virtual media library and stored in a second data storage system corresponding to the second virtual media library, the first data storage system providing synchronous access to data and the second data storage system providing asynchronous access to data.

10. The computer-implemented method of claim 9, wherein the virtual medium is a virtual tape.

11. The computer-implemented method of claim 9, wherein enabling requests for operations to be performed on the data corresponding to the virtual medium includes causing the data to be accessed from a first data storage service and loaded to a second data storage service.

12. The computer-implemented method of claim 9, wherein the element is a virtual import/export slot.

13. The computer-implemented method of claim 9, wherein indicating the virtual medium being located in the second virtual media library includes indicating the virtual medium being located in a second element that shares a common identifier with the element.

14. The computer-implemented method of claim 9, wherein at least one of the receiving, updating and causing includes one or more read and write operations.

15. A system, comprising:
   one or more processors; and
   memory including instructions that, when executed by the one or more processors, cause the computer system to:
      implement at least:
         a first virtual media library comprising a first virtual media changer; and
         a second virtual media library; and
      cause data from a data storage service to become available for access as a result of receipt of a request for the first virtual media changer to move a virtual medium from the first virtual media library to the second virtual media library, the first virtual media library providing synchronous access to data and the second virtual media library providing asynchronous access to data.

16. The system of claim 15, wherein:
   the request to move the virtual medium from the first virtual media library to the second virtual media library is a request to move the virtual medium to a first element of the first virtual media library; and
   moving the virtual medium to the first element of the first virtual media library causes the virtual medium to become virtual located in the second virtual media library.

17. The system of claim 16, wherein moving the virtual medium to the first element of the first virtual media library further causes the virtual medium to become virtually located in a second element of the second virtual media library that shares an identifier with the first element.

18. The system of claim 16, wherein the first element is a virtual import/export slot.

19. The system of claim 15, wherein causing the data from the data storage service to become available includes causing the data to be accessed from the data storage service and provided to another data storage service.

20. The system of claim 15, wherein the first virtual media library lacks a virtual media drive.

21. The system of claim 15, wherein causing the data from the data storage service to become available includes providing the data to another data storage service and deleting the data from the data storage service.

22. The system of claim 15, wherein causing the data from the data storage service to become available includes causing the data to be simultaneously stored in the data storage service and another data service during availability of the data.

23. A non-transitory machine-readable storage medium having stored thereon instructions that, when executed by one or more processors of a computer system, cause the computer system to:
- implement a plurality of virtual media libraries that correspond to a plurality of data storage systems such that each virtual media library of the plurality of virtual media libraries corresponds to a respective data storage system;
- provide an interface that enables a client system to issue commands to the computer system;
- orchestrate the storage of data among the plurality of data storage systems in accordance with received commands to move virtual media among the plurality of virtual media libraries; and
- as a result of a received command to move a virtual medium from a first virtual media library to a second virtual media library, causing data corresponding to the virtual medium to be accessed from a first data storage system lacking synchronous data access and provided to a second data storage system that provides synchronous data access.

24. The non-transitory machine-readable storage medium of claim 23, wherein the commands include small computer system interface (SCSI) commands.

25. The non-transitory machine-readable storage medium of claim 23, wherein moving the virtual media among the virtual media libraries is causable by commands to virtually move the virtual media to virtual import/export slots.

26. The non-transitory machine-readable storage medium of claim 23, wherein the virtual media include virtual tapes.

27. The non-transitory machine-readable storage medium of claim 23, wherein the commands consist of small computer system interface (SCSI) commands.

28. The non-transitory machine-readable storage medium of claim 23, wherein the plurality of virtual media libraries include a first virtual media library and a second virtual media library, the first virtual media library having a first virtual element and the second virtual media library having a second virtual element that is logically connected with the first virtual element.

29. The non-transitory machine-readable storage medium of claim 28, wherein the first virtual element and second virtual element lack a common identifier.

* * * * *